US012586493B2

(12) United States Patent
Hamada

(10) Patent No.: US 12,586,493 B2
(45) Date of Patent: Mar. 24, 2026

(54) VEHICULAR DISPLAY DEVICE

(71) Applicant: Nippon Seiki Co., Ltd., Niigata (JP)

(72) Inventor: Kazunari Hamada, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/953,453

(22) Filed: Nov. 20, 2024

(65) Prior Publication Data

US 2025/0201154 A1 Jun. 19, 2025

(30) Foreign Application Priority Data

Dec. 13, 2023 (JP) ................................. 2023-209790

(51) Int. Cl.
*G09G 3/00* (2006.01)
*B60K 35/233* (2024.01)
*G02B 27/01* (2006.01)
*B60K 35/81* (2024.01)

(52) U.S. Cl.
CPC ......... *G09G 3/002* (2013.01); *G02B 27/0101* (2013.01); *B60K 35/233* (2024.01); *B60K 35/81* (2024.01); *B60K 2360/23* (2024.01); *G09G 2380/10* (2013.01)

(58) Field of Classification Search
CPC ................................. B60K 35/23; B60K 35/10
See application file for complete search history.

(56) References Cited

U.S. PATENT DOCUMENTS

| | | | | |
|---|---|---|---|---|
| 2014/0293431 A1* | 10/2014 | Ishimoto | ............ | G02B 27/0149 |
| | | | | 353/121 |
| 2017/0085847 A1 | 3/2017 | Kurosawa | | |
| 2017/0322760 A1* | 11/2017 | Soh | ........................ | B60K 35/29 |
| 2020/0285063 A1* | 9/2020 | Kawamura | ........ | G02B 27/0179 |
| 2022/0121866 A1* | 4/2022 | Balch | .................... | B60W 40/08 |
| 2022/0144172 A1* | 5/2022 | Fukuma | ................. | B60K 35/10 |

FOREIGN PATENT DOCUMENTS

| | | |
|---|---|---|
| JP | 2017-56844 A | 3/2017 |

* cited by examiner

*Primary Examiner* — Nan-Ying Yang
(74) *Attorney, Agent, or Firm* — Rimon P.C.

(57) ABSTRACT

A vehicular display device emits display light from an opening toward a windshield to cause a virtual image and a real image of a display image represented by the display light to be visually recognized and includes a display unit that includes a display element, transmits light emitted by a light source, and displays the display image, a reflection unit that reflects light representing the display image displayed on the display unit toward the windshield, and a control unit that performs a detection process to detect a state change in a seat accompanied with a change in an eyellipse Ey of an occupant, and a turning-off process to turn off the display light at least during a period from a change start to a change completion of the state change in the seat based on a detection result of the detection process.

6 Claims, 6 Drawing Sheets

F i g .　4
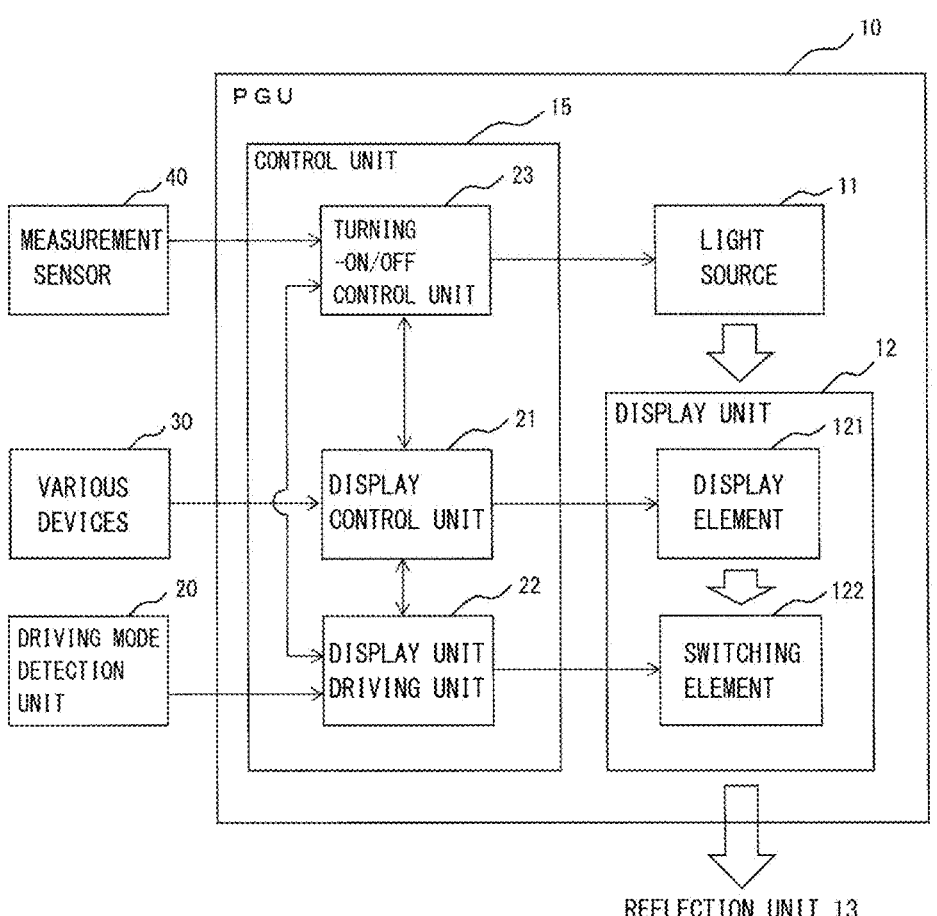

F i g.  6
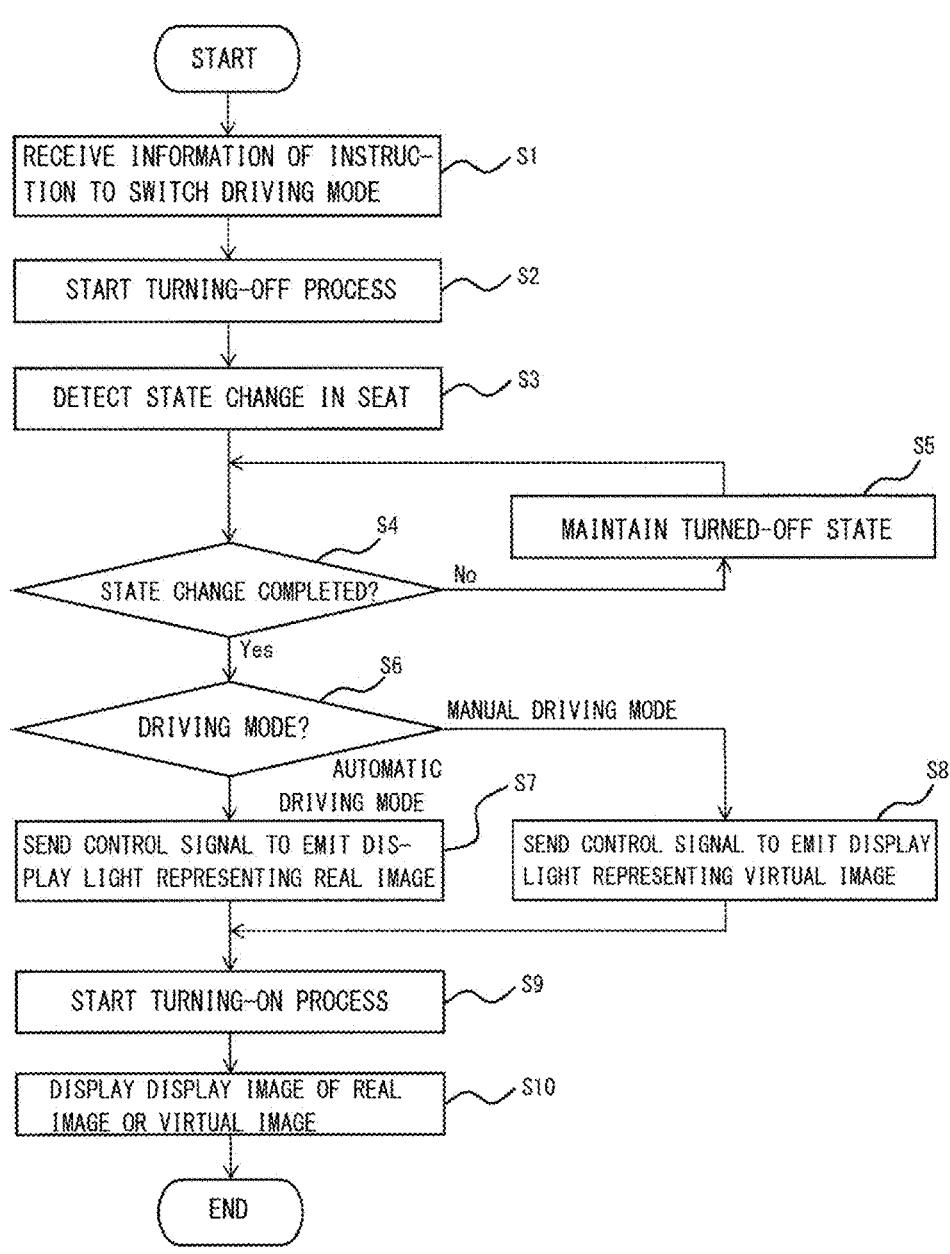

VEHICULAR DISPLAY DEVICE

CROSS-REFERENCE TO RELATED APPLICATIONS

This application claims benefit of foreign priority to Japanese Patent Application No. 2023-209790 filed on Dec. 13, 2023, and the entire contents of each of which are hereby incorporated by reference.

TECHNICAL FIELD

The present invention relates to a vehicular display device that displays a virtual image and a real image to a viewer in a switching manner.

BACKGROUND ART

There is a conventionally known electronic device described in for example Patent Document 1. Patent Document 1 discloses that an electronic device determines, based on the traveling state of a vehicle, whether to display a virtual image of a second image at a first position near display means that displays a first image or to display the virtual image of the second image at a second position far from a windshield of the vehicle and switches a display position.

PRIOR ART DOCUMENT

Patent Document

Patent Document 1: Japanese Unexamined Patent Publication No. 2017-56844

SUMMARY OF INVENTION

Technical Problem

However, the above-described conventional display device has a problem in that, when the range of an eyellipse, an eyebox, or the like (hereinafter, simply referred to as eyellipse) serving as a reference regarding visibility is set in different ranges in a case where the virtual image is visually recognized at the first position and in a case where the virtual image is visually recognized at the second position, the virtual image is visually recognized at both the first position and the second position at the time of switching the display position, which causes the viewer to feel a sense of discomfort.

Therefore, the present invention has been made in view of the above-described problem and has an object to provide a vehicular display device that eliminates a sense of discomfort felt by a viewer when the range of an eyellipse varies in accordance with switching of a display position.

Solution to Problem

According to the present invention, a vehicular display device 1 is provided in a vehicle C including a seat 50 on which an occupant DR sits and a translucent member WS, emits display light L (L1, L2) from an opening 17 toward the translucent member WS to cause a virtual image VI and a real image RI of a display image represented by the display light L to be visually recognized, and includes a display unit 12 that includes a display element 121, transmits light emitted by a light source 11, and displays the display image, a reflection unit 13 that reflects light representing the display image displayed on the display unit 12 toward the translucent member WS, and a control unit 15 that performs a detection process to detect a state change in the seat 50 accompanied with a change in an eyellipse Ey (Ey1, Ey2) of the occupant DR, and a turning-off process to turn off the display light L at least during a period from a change start to a change completion of the state change in the seat 50 based on a detection result of the detection process.

Advantageous Effects of Invention

According to the present invention, when there is a state change in the seat accompanied with a change in the eyellipse of the occupant, the display light of the display unit is turned off during a period from a change start to a change completion, and thus it is possible to prevent the occupant from feeling a sense of discomfort in visually recognizing the display image.

BRIEF DESCRIPTION OF DRAWINGS

FIG. 4 is a functional block diagram illustrating a configuration of a PGU in the vehicular display device according to the first embodiment of the present invention.

FIG. 6 is a flowchart illustrating an example of processing of a control unit in the vehicular display device according to the first embodiment of the present invention.

DESCRIPTION OF EMBODIMENTS

First Embodiment of Present Invention

Figure 1:
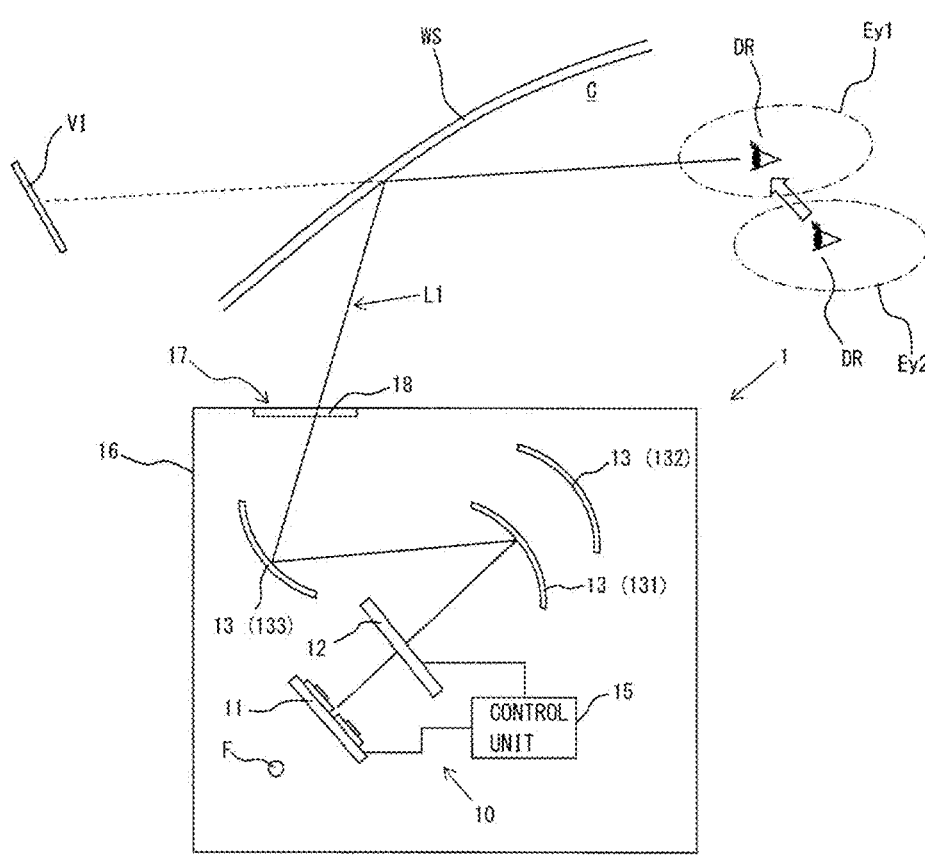
FIG. 1 is a diagram illustrating a configuration in a case where a virtual image is generated in a vehicular display device according to a first embodiment of the present invention.

Hereinafter, a vehicular display device according to the present embodiment will be described with reference to the drawings. FIG. 1 is a diagram illustrating a configuration in a case where a virtual image is generated in the vehicular display device according to the present embodiment, and FIG. 2 is a diagram illustrating a configuration in a case where a real image is generated in the vehicular display device according to the present embodiment.

Figure 2:
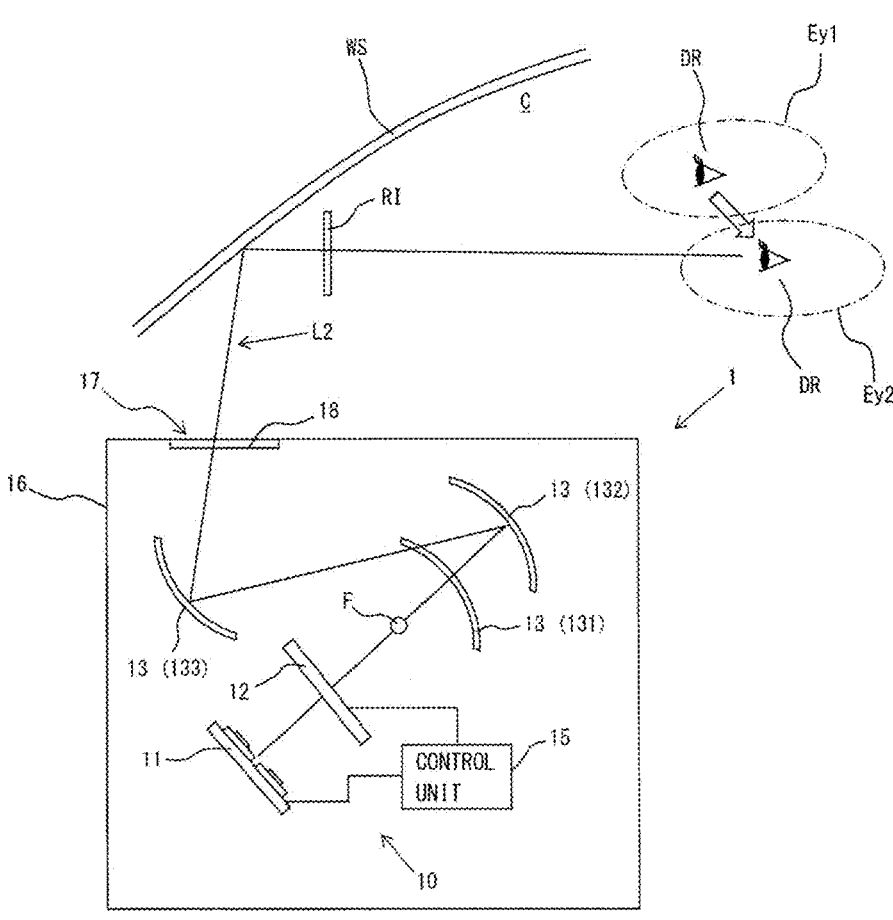
FIG. 2 is a diagram illustrating a configuration in a case where a real image is generated in the vehicular display device according to the first embodiment of the present invention.

In FIGS. 1 and 2, the vehicular display device 1 includes a picture generation unit (PGU) 10 that includes a light source 11 that includes a light emitting diode, which is mounted on, for example, a wiring board and emits light in a visible wavelength region, and emits white light, a display unit 12 that generates an image with the light incident from the light source 11 and displays the image by switching polarized light of the emitted light between first polarized light and second polarized light different from each other, and a control unit 15 that performs switching control of turning on/off the light source 11, control of display content on the display unit 12, switching control of the first polarized light and the second polarized light, and the like, and a reflection unit 13 that reflects display light L (display light L1 representing a display image of a virtual image VI in the case of FIG. 1, and display light L2 representing a display image of a real image RI in the case of FIG. 2) representing the display image displayed on the display unit 12 toward a windshield WS (translucent member), and they are accommodated in a housing 16. The housing 16 is provided with an opening 17 (emission port) from which the display light L is emitted, and a cover glass 18 for protecting the inside is provided in the opening 17. The windshield WS is an example of a light projecting member, and the opening 17 is an example of an emission port.

The vehicular display device 1 is provided below the windshield WS of a vehicle C (for example, inside an instrument panel), emits the display light L (L1, L2), and projects the display light L onto the windshield WS. The display light L is generated by the light source 11 and the display unit 12 of the PGU 10. The display light L emitted from the display unit 12 travels along the reflection unit 13 and is emitted from the opening 17 of the housing 16 through a cover glass 18. An occupant DR (passenger) in the vehicle C visually recognizes the display light L reflected by the windshield WS from a viewpoint within the range of an eyellipse Ey (Ey1, Ey2) and thus can visually recognize the virtual image VI illustrated in FIG. 1 on the back side of the windshield WS and the real image RI illustrated in FIG. 2 on the near side. Here, as illustrated in FIG. 1, the center position of the eyellipse Ey1 is set to be closer to the front side and the upper side of the vehicle C than the eyellipse Ey2.

Figures 5A, 5B:
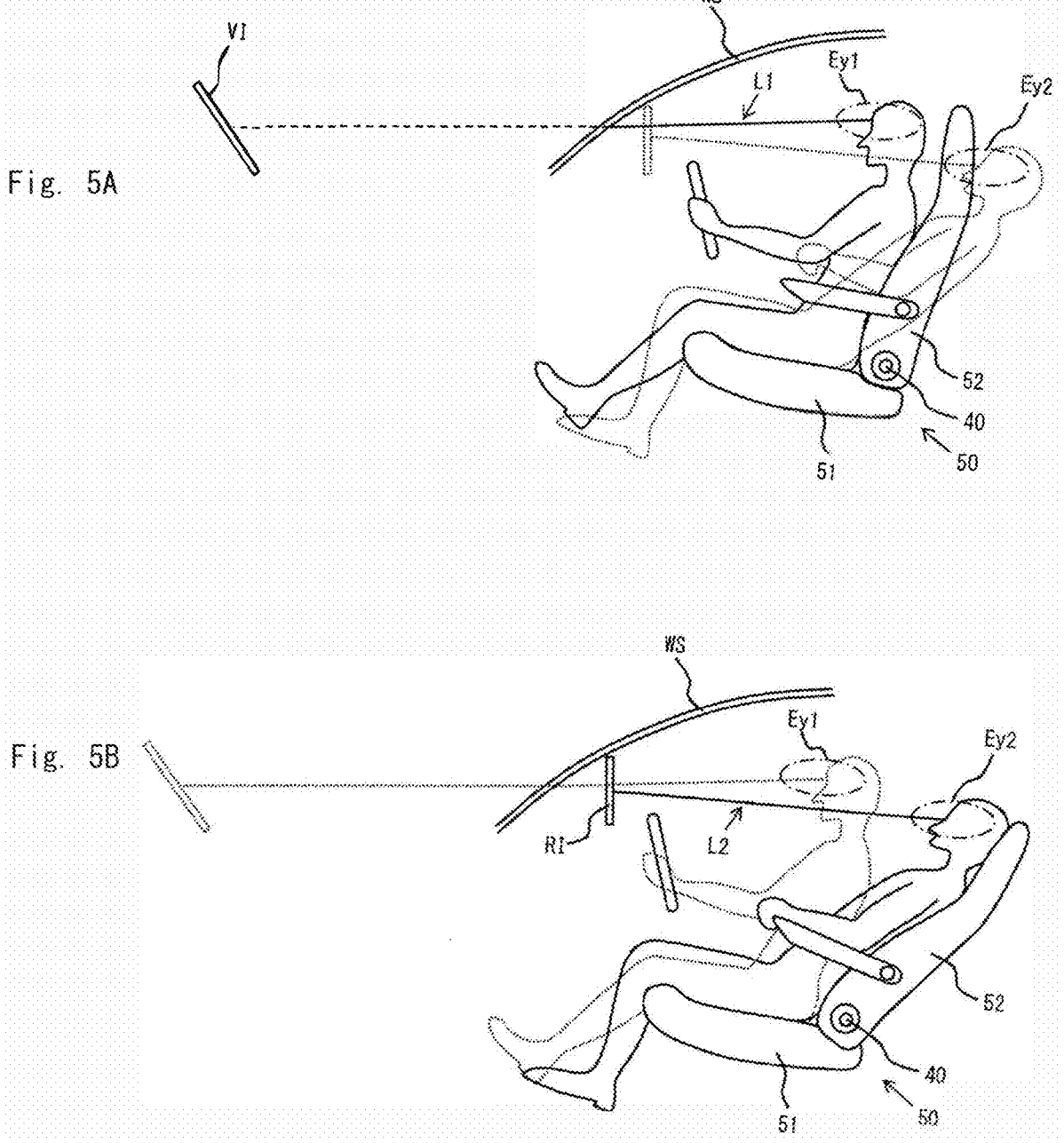
FIGS. 5A and 5B are diagrams illustrating, in the vehicular display device according to the first embodiment of the present invention, an example of (5A) a state change in a seat accompanied with a change in an eyellipse in a manual driving mode and (5B) a state change in a seat accompanied with a change in an eyellipse in an automatic driving mode.

In the virtual image VI illustrated in FIG. 1, the information that is highly necessary to call attention of the occupant DR, such as vehicle information such as the speed of the vehicle C and the engine speed, route guidance display such as turn-by-turn and a map, a blind spot indicator, and warning display such as a speed limit excess warning, are displayed in the manual driving mode on the far side of the windshield WS when viewed from the occupant DR. In addition, in the real image RI illustrated in FIG. 2, for example, entertainment content, an assistant or an agent that supports the occupant DR, and a character indicating the assistant or the agent are displayed in the automatic driving mode on the near side of the windshield WS when viewed from the occupant DR. The virtual image VI and the real image RI include a background portion in addition to characters and icons indicating the above information and have, for example, a substantially rectangular shape in a plan view from the occupant DR. Here, the vehicle C on which the vehicular display device 1 according to the present embodiment is mounted has an automatic driving mode in which automatic driving is performed by a computer and a manual driving mode in which the occupant DR performs a driving operation, and the automatic driving mode and the manual driving mode are switched when a predetermined trigger (for example, an operation of an automatic/manual switch by the occupant DR, entry into an expressway or a general road, timing of parking, stopping, or traveling, or the like) is detected. In the case of the automatic driving mode, as illustrated in FIGS. 5A and 5B, the state of a seat 50 on which the occupant DR is seated changes such that the inclination angle of a backrest portion 52 of the seat 50 (the angle of backward rotation with respect to the state in which the angle between the seat surface of the seat 50 provided horizontally (parallel to the front-rear direction) and the backrest portion 52 is substantially right angle) increases (the backrest portion 52 is in a reclining position, and hereinafter this state is referred to as reclining position) or the height of the seat surface of the seat portion 51 decreases. In the case of the manual driving mode, the state of the seat 50 on which the occupant DR is seated changes such that the inclination angle of the backrest portion 52 of the seat 50 decreases (the backrest portion 52 is in a standing state, and hereinafter this state is referred to as a driving position) or the height of the seat portion 51 increases.

The vehicular display device 1 is configured to switch the display of the virtual image VI and the real image RI in accordance with a state change in the seat 50, and for example, in the reclining position, as illustrated in FIG. 2, a display process is performed such that the occupant DR visually recognizes the real image RI in the range of the eyellipse Ey2, and in the driving position, as illustrated in FIG. 1, a display process is performed such that the occupant DR visually recognizes the virtual image VI in the range of the eyellipse Ey1. In this case, while the state of the seat 50 is changing, the position of the eyes of the occupant DR changes in accordance with the state change in the seat 50, and thus the position of the eyes moves between the eyellipse Ey1 and the eyellipse Ey2, which causes a sense of discomfort in the visibility of the occupant DR. Therefore, the control unit 15 performs control such that the display light L is turned off during a period from a change start to a change completion of the state change in the seat 50. The turning-off process of the control unit 15 in accordance with the state change in the seat 50 will be described below in detail.

Figure 3:
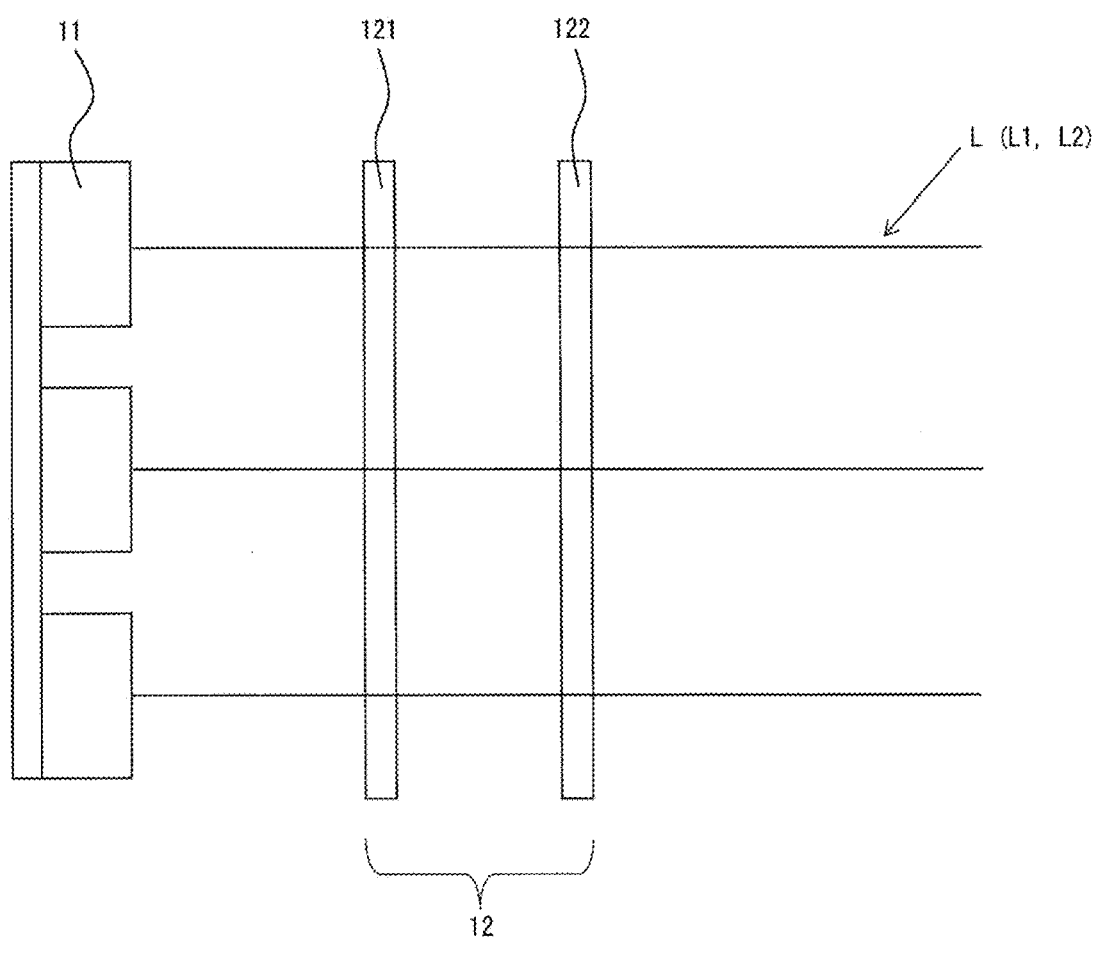
FIG. 3 is a schematic view illustrating structures of a light source and a display unit in the vehicular display device according to the first embodiment of the present invention.

Hereinafter, each configuration illustrated in FIGS. 1 and 2 will be described in detail. FIG. 3 is a schematic view illustrating the structures of the light source 11 and the display unit 12 in the vehicular display device 1 according to the present embodiment. As illustrated in FIG. 3, the display unit 12 is provided closer to the emission port along the optical path than the light source 11. The display unit 12 includes, for example, a thin film transistor (TFT) display element 121 and a switching element 122 that is provided closer to the emission port along the optical path than the display element 121 and switches the polarized light of the emitted display light L between first polarized light and second polarized light different from each other.

Although the first polarized light is S-polarized light and the second polarized light is P-polarized light in the following description, the first polarized light may be P-polarized light and the second polarized light may be S-polarized light. In addition, the first polarized light and the second polarized light are not limited to the S-polarized light and the P-polarized light and are appropriate when the polarization angles of the first polarized light and the second polarized light are different from each other and, for example, the polarization angles are preferably different from each other by at least 22.5 degrees or more.

The light source 11 is connected to a turning-on/off control unit 23, which will be described below with reference to FIG. 4, so that turning on/off is controlled in accordance with a signal sent from the turning-on/off control unit 23. For example, the control is performed such that the light is turned on when the vehicular display device 1 is activated and is turned off during stoppage, or the light is turned off from a change start to a change completion of the state change in the seat 50 as described above. The display element 121 is connected to a display control unit 21, which will be described below with reference to FIG. 4, and forms the light representing a figure of an arbitrary shape in accordance with a signal sent from the display control unit 21. The switching element 122 is an element that is connected to a display unit driving unit 22 described below in FIG. 4 and switches the polarized light in accordance with a signal sent from the display unit driving unit 22, and extracts only a light beam that is specific polarized light, specifically, the S-polarized light as the first polarized light and the P-polarized light as the second polarized light as described above among the light beams emitted from the display element 121 and performs a process to switch the light beams.

The switching of the polarized light by the switching element 122 may be performed by electrical processing, or the polarized light may be switched by providing a polarizing plate or a wavelength plate on the emission port side of the display element 121 and physically rotating the polarizing plate or the wavelength plate at a predetermined angle with respect to a central axis when the optical axis direction is a central axis direction. In any case, the polarized light is switched by the control of the display unit driving unit 22 described above.

The reflection unit 13 includes a first mirror 131, a second mirror 132, and a third mirror 133, each of which is a flat mirror or a curved mirror. The first mirror 131 reflects the display light L1 (first light beam), which is the S-polarized light as the first polarized light, and transmits the display light L2 (second light beam), which is the P-polarized light as the second polarized light. The second mirror 132 reflects the display light L2 (second light beam) transmitted through the first mirror 131. The display lights L1 and L2 reflected by the first mirror 131 and the second mirror 132, respectively, are guided to the third mirror 133, reflected by the third mirror 133, and emitted to the windshield WS so that the occupant DR can visually recognize the display images. The display light L1 is an example of a first light beam, and the display light L2 is an example of a second light beam.

As illustrated in FIG. 2, since the first mirror 131 is a mirror that transmits the display light L2, the display light L2 reflected by the second mirror 132 can naturally be transmitted from the back side to the front side of the second mirror 132. That is, the display light L2 transmitted through the first mirror 131 is reflected by the second mirror 132, is transmitted through the first mirror 131 again, and is guided to the third mirror 133. Thus, the second mirror 132 can be provided close to the back side of the first mirror 131, and an increase in the size of the housing 16 can be prevented.

The display image represented by the display light L1 in FIG. 1 and the display image represented by the display light L2 in FIG. 2 will be specifically described. As illustrated in FIG. 1, in a case where the display light L1, which is the S-polarized light, is emitted to the first mirror 131, and the display unit 12 is provided at a position sufficiently close to the first mirror 131, when the first mirror 131, the third mirror 133, and the windshield WS are regarded as one imaging optical system, the position of the display unit 12 becomes closer than the focal distance of the imaging optical system. That is, the positional relationship between the display unit 12 and an optical focal point F of the imaging optical system is in a first state in which the display unit 12 is provided closer to the emission port than the optical focal point F. In the case of the first state, the occupant DR visually recognizes the virtual image VI at a distance.

On the other hand, as illustrated in FIG. 2, in a case where the display light L2, which is the P-polarized light, is emitted to the second mirror 132, and the display unit 12 is provided at a position sufficiently far from the second mirror 132, when the second mirror 132, the third mirror 133, and the windshield WS are regarded as one imaging optical system, the position of the display unit 12 becomes farther than the focal distance of the imaging optical system. That is, the positional relationship between the display unit 12 and the optical focal point F of the imaging optical system is in a second state in which the display unit 12 is provided closer to the light source 11 than the optical focal point F. In the case of the second state, the occupant DR visually recognizes the real image RI in front.

That is, for example, in the manual driving mode, when the virtual image VI is desired to be visually recognized on the outer side of the windshield WS when viewed from the occupant DR, the switching element 122 of the display unit 12 switches the display light L to be emitted as the display light L1 which is the S-polarized light, and the display image represented by the display light L1 is displayed on the windshield WS by the imaging optical system including the first mirror 131, the third mirror 133, and the windshield WS. In addition, for example, in the automatic driving mode, when the real image RI is desired to be visually recognized on the inner side of the windshield WS when viewed from the occupant DR, the switching element 122 of the display unit 12 switches the display light L to be emitted as the display light L2 which is the P-polarized light, and the display image represented by the display light L2 is displayed on the windshield WS by the imaging optical system including the second mirror 132, the third mirror 133, and the windshield WS.

At this time, the display image (the virtual image VI and the real image RI) represented by the display light L may be displayed to be perpendicular to the road surface or may be displayed to be inclined by pitch rotation of the display unit 12 in a case where the optical axis direction is the roll axis.

As described above, the control unit 15 in FIGS. 1 and 2 performs switching control of turning on/off the PGU 10, control of the display content in the display unit 12, switching control of the first polarized light and the second polarized light, and the like. FIG. 4 is a functional block diagram illustrating a configuration of the PGU 10 in the vehicular display device 1 according to the present embodiment. It should be noted that FIG. 4 illustrates only the minimum necessary configuration directly related to the present invention, and other known configurations are omitted.

In FIG. 4, the PGU 10 includes the control unit 15, the light source 11, and the display unit 12. The control unit 15 includes the display control unit 21 that gives a command to the display unit 12 so as to generate the light representing a figure of an arbitrary shape based on the information sent from various devices 30 such as a vehicle speed sensor, a navigation device, Radio Detecting and Ranging (RADAR), or Light Detection and Ranging, Laser Imaging Detection and Ranging (LiDAR), the display unit driving unit 22 that gives a command to the switching element 122 so as to switch the polarizing direction of the display light L based on a signal transmitted from a driving mode detection unit 20 including, for example, a switch that switches the driving mode (manual driving mode or automatic driving mode) and a processing unit that detects the switching of the driving mode, and the turning-on/off control unit 23 that detects the state of the seat 50 based on the result measured by a measurement sensor 40 that measures the state of the seat 50, for example, and gives a command to the light source 11 so as to switch turning on/off of the light source 11. The display control unit 21, the display unit driving unit 22, and the turning-on/off control unit 23 cooperate with one another to control the vehicular display device 1.

With the configuration of FIG. 4, for example, in the manual driving mode, the display unit driving unit 22 performs switching control of the switching element 122 to emit the display light L1, which is the S-polarized light, and the display control unit 21 controls the display element 121 to generate the display light L1 representing the vehicle information, the route guidance information, the warning display, and the like, as described above.

In addition, for example, in the case of the automatic driving mode, the display unit driving unit 22 performs switching control of the switching element 122 to emit the display light L2, which is P-polarized light, and the display control unit 21 controls the display element 121 to generate the display light L2 representing an assistant or an agent supporting the occupant DR as described above, a character indicating the assistant or the agent, or the like.

When the driving mode is switched from the manual driving mode to the automatic driving mode or from the automatic driving mode to the manual driving mode, the turning-on/off control unit 23 detects a state change in the seat 50 accompanied with a change in the eyellipse Ey1 or the eyellipse Ey2 of the occupant DR and controls the light source 11 to turn off the display lights L1 and L2 at least during a period from a change start to a change completion of the state change in the seat 50.

FIGS. 5A and 5B are diagrams illustrating an example of a state change in the seat 50 accompanied with a change in the eyellipse Ey at the time of switching the driving mode in the vehicular display device 1 according to the present embodiment, FIG. 5A illustrates a seat state in the case of the manual driving mode, and FIG. 5B illustrates a seat state in the case of the automatic driving mode. As illustrated in FIGS. 5A and 5B, the seat 50 includes the seat portion 51 and the backrest portion 52, and the measurement sensor 40 measures the inclination angle of the backrest portion 52 and, if necessary, the height of the seat portion 51.

The turning-on/off control unit 23 detects an increase in the inclination angle of the backrest portion 52 in accordance with switching from the manual driving mode (driving position) of FIG. 5A to the automatic driving mode (reclining position) of FIG. 5B and a decrease in the inclination angle of the backrest portion 52 in accordance with switching from the automatic driving mode (reclining position) of FIG. 5B to the manual driving mode (driving position) of FIG. 5A from the measurement result of the measurement sensor 40 (detection process). Then, the turning-on/off control unit 23 turns off the light source 11 so that the display lights L1 and L2 are not displayed at least during a period from an increase start to an increase completion of the inclination angle or during a period from a decrease start to a decrease completion of the inclination angle (turning-off process).

In some of the vehicles C, when the driving mode is switched from the manual driving mode to the automatic driving mode or from the automatic driving mode to the manual driving mode, the height of the seat portion 51 may be changed as a state change in the seat 50 accompanied with a change in the eyellipse Ey1 or the eyellipse Ey2 of the occupant DR. Specifically, the seat portion 51 is set to be higher to improve the field of view in the manual driving mode, and the seat portion 51 is set to be lower for relaxing in the automatic driving mode. That is, in this case, the turning-on/off control unit 23 detects a decrease in the height of the seat portion 51 in accordance with switching from the manual driving mode to the automatic driving mode and an increase in the height of the seat portion 51 in accordance with switching from the automatic driving mode to the manual driving mode (detection process). Then, the turning-on/off control unit 23 turns off the light source 11 so that the display lights L1 and L2 are not displayed at least during a period from an increase start to an increase completion of the height of the seat portion 51 or during a period from a decrease start to a decrease completion of the height of the seat portion 51 (turning-off process).

Next, a process of the control unit 15 will be described. FIG. 6 is a flowchart illustrating an example of a process of the control unit 15 in the vehicular display device 1 according to the present embodiment. First, the display unit driving unit 22 receives an instruction to switch the driving mode from the driving mode detection unit 20 (S1). The turning-on/off control unit 23, which cooperates with the display unit driving unit 22, turns off the light source 11 and starts a turning-off process in which the display lights L1 and L2 are not displayed (S2) (turning-off process). The turning-on/off control unit 23 detects a state change in the seat 50 from the information measured by the measurement sensor 40 (S3). It is determined whether a completion of the state change in the seat 50 is detected (S4), and when a completion of the state change is not detected, the turned-off state is maintained (S5) (turning-off process), and the process in S4 is repeated until the state change is completed. When a completion of the state change is detected, the display unit driving unit 22, which has received the driving mode switching instruction from the driving mode detection unit 20 in S1, determines whether the driving mode is the automatic driving mode or the manual driving mode based on the signal transmitted from the driving mode detection unit 20 (S6).

In the case of the automatic driving mode in S6, the display unit driving unit 22 sends a control signal to the switching element 122 so that the display light L2, which is P-polarized light, is emitted from the display unit 12 (S7) (switching process). At this time, the content to be displayed in the real image RI as described above is extracted as the display content by the display control unit 21 that cooperates with the display unit driving unit 22 and the turning-on/off control unit 23. Further, the seat 50 is in a state suitable for visually recognizing the real image RI displayed in the automatic driving mode (the inclination angle of the backrest portion 52 increases/the height of the seat portion 51 decreases).

In the case of the manual driving mode in S6, the display unit driving unit 22 sends a control signal to the switching element 122 so that the display light L1, which is the S-polarized light, is emitted from the display unit 12 (S8) (switching process). At this time, the content to be displayed in the virtual image VI as described above is extracted as the display content by the display control unit 21 that cooperates with the display unit driving unit 22 and the turning-on/off control unit 23. Further, the seat 50 is in a state suitable for visually recognizing the virtual image VI displayed in the manual driving mode (the inclination angle of the backrest portion 52 decreases/the height of the seat portion 51 increases).

In S7 or S8, when the real image RI or the virtual image VI is ready to be displayed, the turning-on/off control unit 23 ends the turning-off of the light source 11 and starts a turning-on process (S9). Either the real image RI or the virtual image VI is displayed (S10), and the process is terminated. In S9, since the state change in the seat 50 is completed when the turning-on/off control unit 23 starts the turning-on process, the occupant DR can visually recognize the real image RI or the virtual image VI from the viewpoint of the eyellipse Ey suitable for the real image RI or the virtual image VI in a comfortable manner.

In FIG. 6, the processes in S6 and S8 are performed after the completion of the state change in the seat 50 is detected, but may be performed while the turned-off state is maintained in the middle of the state change in the seat 50.

Further, in FIG. 6, the turning-off process is started before the detection of the state change in the seat 50 after the switching of the driving mode, and the turning-on process is performed after the completion of the state change in the seat 50, but the turning-off process may be started at the same time as the state change in the seat 50 after the switching of the driving mode, and the turning-on process may be performed at the same time as the completion of the state change in the seat 50. In this case, as described above, the process of S6 or S8 is executed in the middle of the state change in the seat 50.

Further, in S3, the process to detect the state change in the seat 50 by the turning-on/off control unit 23 is to detect the state change in the seat 50 in accordance with the switching between the visual recognition of the virtual image VI corresponding to the manual driving mode in S1 and the visual recognition of the real image RI corresponding to the automatic driving mode, but as described in another embodiment below, the process may be performed to detect the state change in the seat 50 regardless of the switching of the driving mode.

As described above, in the vehicular display device 1 according to the present embodiment, the control unit 15 performs the detection process to detect the state change in the seat 50 accompanied with the change in the eyellipse Ey of the occupant DR and the turning-off process to turn off the display light L at least during a period from a change start to a change completion of the state change in the seat 50 based on the detection result of the detection process, and thus it is possible to prevent the occupant DR from feeling a sense of discomfort when the display of the virtual image VI/the real image RI is switched in accordance with a state change in the seat 50.

Further, the control unit 15 performs the switching process to switch between the visual recognition of the virtual image VI of the display image in the manual driving mode of the vehicle C and the visual recognition of the real image RI of the display image in the automatic driving mode of the vehicle C and detects the state change in the seat 50 in accordance with the switching between the visual recognition of the virtual image VI corresponding to the manual driving mode and the visual recognition of the real image RI corresponding to the automatic driving mode in the switching process, and thus the display image of the virtual image VI or the real image RI corresponding to the driving mode can be appropriately displayed, and the state change in the seat 50 in accordance with the switching of the driving mode can be reliably detected.

Further, the seat 50 includes the seat portion 51 and the backrest portion 52, the state change in the seat 50 is the angle change of the inclination angle of the backrest portion 52, and the control unit 15 detects, in the detection process, an increase in the inclination angle in accordance with the switching from the manual driving mode to the automatic driving mode by the switching process and a decrease in the inclination angle in accordance with the switching from the automatic driving mode to the manual driving mode by the switching process and, in the turning-off process, turns off the display light L at least during a period from an increase start to an increase completion of the inclination angle or during a period from a decrease start to a decrease completion of the inclination angle, and thus when the eyellipse Ey changes in accordance with a state change in the inclination angle of the backrest portion 52, it is possible to eliminate a sense of discomfort in the visual recognition of the occupant DR, which occurs in the middle of the state change.

Moreover, the state change in the seat 50 is a height change in the seat 50, and the control unit 15 detects, in the detection process, a decrease in the height of the seat 50 in accordance with the switching from the manual driving mode to the automatic driving mode by the switching process and an increase in the height of the seat 50 in accordance with the switching from the automatic driving mode to the manual driving mode by the switching process and, in the turning-off process, turns off the display light L at least during a period from an increase start to an increase completion of the height of the seat 50 or a period from a decrease start to a decrease completion of the height of the seat 50, and thus when the eyellipse Ey changes in accordance with the state change in the height of the seat 50, it is possible to prevent a sense of discomfort in the visual recognition of the occupant DR, which occurs in the middle of the state change.

Furthermore, the reflection unit 13 includes the first mirror 131 that reflects the display light L1 and transmits the display light L2 and the second mirror 132 that reflects the display light L2, and the first mirror 131 and the second mirror 132 are provided such that, when the display element 121 emits the display light L1, the positional relationship between the display unit 12 and the optical focal point F of the imaging optical system including the windshield WS and the reflection unit 13 is such that the display unit 12 is closer to the opening 17 than the optical focal point F and the virtual image VI is visually recognized and, when the display element 121 emits the display light L2, is in the second state in which the display unit 12 is closer to the light source 11 than the optical focal point F and the real image RI is visually recognized, and thus the virtual image VI on the outer side of the windshield WS when viewed from the occupant DR and the real image RI on the inner side of the windshield WS when viewed from the occupant DR may be visually recognized in a switching manner.

Another Embodiment of the Present Invention

The vehicular display device 1 according to another embodiment will be described below. The vehicular display device 1 according to the present embodiment controls turning-on/off of the PGU 10 based on the detection result of the state change in the seat 50 without direction relation to the driving mode. In the present embodiment, the same description as that in the first embodiment will not be repeated.

In the vehicular display device 1 according to the present embodiment, as in the case of the first embodiment, the virtual image VI is displayed so as to be visually recognized on the outer side of the windshield WS when viewed from the occupant DR, and the real image RI is displayed so as to be visually recognized on the inner side of the windshield WS when viewed from the occupant DR. Further, there are the eyellipses Ey1 and Ey2 suitable for viewing the respective display images (the virtual image VI and the real image RI). In the configuration according to the first embodiment, the state of the seat 50 is changed in accordance with the switching of the display image corresponding to the driving mode; however, in the configuration according to the present embodiment, the display image is turned on/off when the state change in the seat 50 is detected regardless of the driving mode.

Specifically, in the detection process, the control unit 15 detects an increase in the inclination angle of the backrest portion 52 and a decrease in the inclination angle of the backrest portion 52 and, in the turning-off process, turns off the display light L at least during a period from when the inclination angle of the backrest portion 52 increases to reach a first angle to when the inclination angle reaches a second angle larger than the first angle or at least during a period from when the inclination angle of the backrest portion 52 decreases to reach the second angle to when the inclination angle reaches the first angle.

The above-described first angle is the inclination angle of the backrest portion 52 when the eyes of the occupant DR are located at the boundary of the lower end portion of the eyellipse Ey1, and the second angle is the inclination angle of the backrest portion 52 when the eyes of the occupant DR are located at the boundary of the upper end portion of the eyellipse Ey2.

That is, while the position of the eyes of the occupant DR moves from the range of the eyellipse Ey1 to the eyellipse Ey2 due to the angle adjustment of the backrest portion 52, the light source 11 of the PGU 10 is turned off so that the display image is not displayed. Also, while the position of the eyes of the occupant DR moves from the range of the eyellipse Ey2 to the eyellipse Ey1 due to the angle adjustment of the backrest portion 52, the light source 11 of the PGU 10 is turned off so that the display image is not displayed.

In this way, when the eyellipse Ey changes in accordance with the state change of the inclination angle of the backrest portion 52, it is possible to eliminate a sense of discomfort in the visual recognition of the occupant DR, which occurs in the middle of the state change.

In addition, in the detection process, the control unit 15 detects a decrease in the height of the seat portion 51 and an increase in the height of the seat portion 51 and, in the turning-off process, turns off the display light L at least during a period from when the height of the seat portion 51 decreases to reach a first height to when the height reaches a second height lower than the first height, or at least during a period from when the height of the seat portion 51 increases to reach the second height to when the height reaches the first height.

The above-described first height is the height of the seat portion 51 when the eyes of the occupant DR are located at the boundary of the lower end portion of the eyellipse Ey1, and the second height is the height of the seat portion 51 when the eyes of the occupant DR are located at the boundary of the upper end portion of the eyellipse Ey2.

In this way, when the eyellipse Ey changes in accordance with the state change in the height of the seat portion 51, it is possible to eliminate a sense of discomfort in the visual recognition of the occupant DR, which occurs in the middle of the state change.

In the above description, the vehicular display device 1 switches between the first polarized light and the second polarized light when switching between the display of the virtual image VI and the display of the real image RI; however, the method for switching between the display of the virtual image VI and the display of the real image RI is arbitrary, and for example, the arrangement of the display unit 12 may be slid and moved in the optical axis direction so that the distance between the optical focal point F and the display unit 12 is changed and the virtual image VI and the real image RI are displayed in a switching manner. In addition, each optical system may be formed by shifting the axis of the light beam emitted from the display unit 12 when the virtual image VI is displayed and the real image RI is displayed, and the virtual image VI and the real image RI may be displayed in a switching manner.

In addition, in a case where it is desired to adjust the inclination angle of the virtual image VI or the real image RI with respect to the road surface, for example, a motor that executes pitch rotation of the display unit 12 using the optical axis direction as a roll axis may be provided.

The inclination of the display unit 12 may be changed by the motor to display the real image RI standing perpendicular to the road surface or the virtual image VI inclined with respect to the road surface.

REFERENCE SIGNS LIST

C VEHICLE
DR OCCUPANT
Ey EYELLIPSE
F OPTICAL FOCAL POINT
L DISPLAY LIGHT
RI REAL IMAGE
VI VIRTUAL IMAGE
WS WINDSHIELD
1 VEHICULAR DISPLAY DEVICE
10 PGU
11 LIGHT SOURCE
12 DISPLAY UNIT
13 REFLECTION UNIT
15 CONTROL UNIT
16 HOUSING
17 OPENING
18 COVER GLASS
20 DRIVING MODE DETECTION UNIT
21 DISPLAY CONTROL UNIT
22 DISPLAY UNIT DRIVING UNIT
23 TURNING-ON/OFF CONTROL UNIT
30 VARIOUS DEVICES
40 MEASUREMENT SENSOR
50 SEAT
51 SEAT PORTION
52 BACKREST PORTION
121 DISPLAY ELEMENT
122 SWITCHING ELEMENT
131 FIRST MIRROR
132 SECOND MIRROR
133 THIRD MIRROR

The invention claimed is:

1. A vehicular display device that is provided in a vehicle including a seat on which an occupant sits and a translucent member and that emits display light from an emission port toward the translucent member to cause a virtual image and a real image of a display image represented by the display light to be visually recognized, the vehicular display device comprising:

a display unit that includes a display element, transmits light emitted by a light source, and displays the display image;

a reflection unit including a mirror that reflects light representing the display image displayed on the display unit toward the translucent member; and a control unit that performs a detection process to detect a state change in the seat accompanied with a change in an eyellipse of the occupant, and a turning-off process to turn off the display light at least during a period from a change start to a change completion of the state change in the seat based on a detection result of the detection process, wherein the control unit further performs a switching process to perform switching such that the virtual image of the display image is visually recognized in a manual driving mode of the vehicle and the real image of the display image is virtually recognized in an automatic driving mode of the vehicle, and in the detection process, detects a state change in the seat in accordance with switching between visual recognition of the virtual image corresponding to the manual driving mode and visual recognition of the real image corresponding to the automatic driving mode in the switching process.

2. The vehicular display device according to claim 1, wherein the seat includes a seat portion and a backrest portion, the state change in the seat is an angle change in an inclination angle of the backrest portion, and the control unit in the detection process, detects an increase in the inclination angle in accordance with switching from the manual driving mode to the automatic driving mode by the switching process and a decrease in the inclination angle in accordance with switching from the automatic driving mode to the manual driving mode by the switching process, and in the turning-off process, turns off the display light at least during a period from an increase start to an increase completion of the inclination angle or during a period from a decrease start to a decrease completion of the inclination angle.

3. The vehicular display device according to claim 1, wherein the state change in the seat is a height change in the seat, and the control unit in the detection process, detects a decrease in a height of the seat in accordance with switching from the manual driving mode to the automatic driving mode by the switching process and an increase in the height of the seat in accordance with switching from the automatic driving mode to the manual driving mode by the switching process, and in the turning-off process, turns off the display light at least during a period from an increase start to an increase completion of the height of the seat or during a period from a decrease start to a decrease completion of the height of the seat.

4. A vehicular display device that is provided in a vehicle including a seat on which an occupant sits and a translucent member and that emits display light from an emission port toward the translucent member to cause a virtual image and a real image of a display image represented by the display light to be visually recognized, the vehicular display device comprising:

a display unit that includes a display element, transmits light emitted by a light source, and displays the display image;

a reflection unit including a mirror that reflects light representing the display image displayed on the display unit toward the translucent member; and a control unit that performs a detection process to detect a state change in the seat accompanied with a change in an eyellipse of the occupant, and a turning-off process to turn off the display light at least during a period from a change start to a change completion of the state change in the seat based on a detection result of the detection process, wherein the seat includes a seat portion and a backrest portion, the state change in the seat is an angle change in an inclination angle of the backrest portion, and the control unit in the detection process, detects an increase in the inclination angle and a decrease in the inclination angle, and in the turning-off process, turns off the display light at least during a period from when the inclination angle increases to reach a first angle to when the inclination angle reaches a second angle larger than the first angle, or at least during a period from when the inclination angle decreases to reach the second angle to when the inclination angle reaches the first angle.

5. The vehicular display device that is provided in a vehicle including a seat on which an occupant sits and a translucent member and that emits display light from an emission port toward the translucent member to cause a virtual image and a real image of a display image represented by the display light to be visually recognized, the vehicular display device comprising:

a display unit that includes a display element, transmits light emitted by a light source, and displays the display image;

a reflection unit including a mirror that reflects light representing the display image displayed on the display unit toward the translucent member; and a control unit that performs a detection process to detect a state change in the seat accompanied with a change in an eyellipse of the occupant, and a turning-off process to turn off the display light at least during a period from a change start to a change completion of the state change in the seat based on a detection result of the detection process, wherein the state change in the seat is a height change in the seat, and the control unit in the detection process, detects a decrease in the height and an increase in the height, and in the turning-off process, turns off the display light at least during a period from when the height decreases to reach a first height to when the height reaches a second height lower than the first height, or at least during a period from when the height increases to reach the second height to when the height reaches the first height.

6. A vehicular display device that is provided in a vehicle including a seat on which an occupant sits and a translucent member and that emits display light from an emission port toward the translucent member to cause a virtual image and a real image of a display image represented by the display light to be visually recognized, the vehicular display device comprising:

a display unit that includes a display element, transmits light emitted by a light source, and displays the display image;

a reflection unit that reflects light representing the display image displayed on the display unit toward the translucent member; and a control unit that performs a detection process to detect a state change in the seat accompanied with a change in an eyellipse of the occupant, and a turning-off process to turn off the display light at least during a period from a change start to a change completion of the state change in the seat based on a detection result of the detection process, wherein the reflection unit includes a first mirror that reflects a first light beam and transmits a second light beam, and a second mirror that reflects the second light beam, and the first mirror and the second mirror are provided such that, when the display element emits the first light beam, a positional relationship between the display unit and an optical focal point of an imaging optical system including the translucent member and the reflection unit is in a first state in which the display unit is closer to the emission port than the optical focal point and the virtual image is visually recognized, and when the display element emits the second light beam, is in a second state in which the display unit is closer to the light source than the optical focal point and the real image is visually recognized.

* * * * *